March 10, 1959     L. SCHMIDT     2,876,581
FISHING LINE FLOAT
Filed April 20, 1954
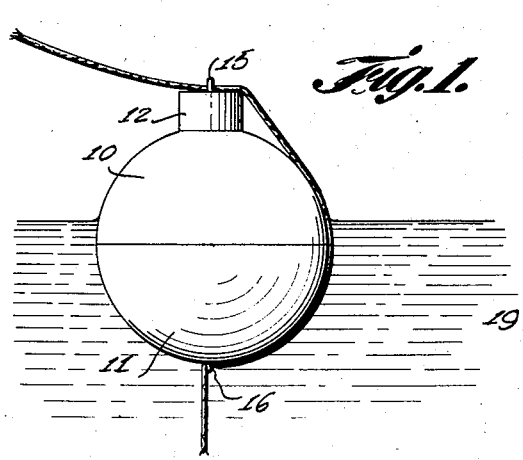
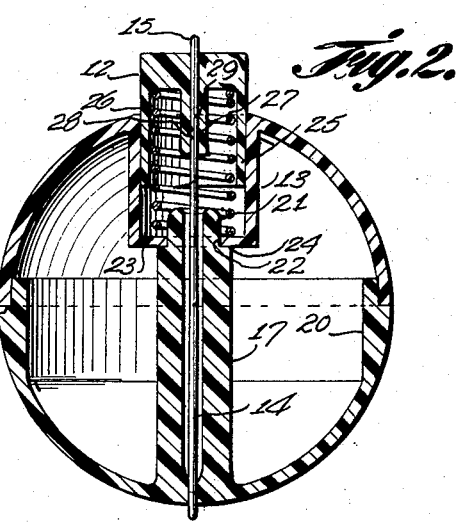
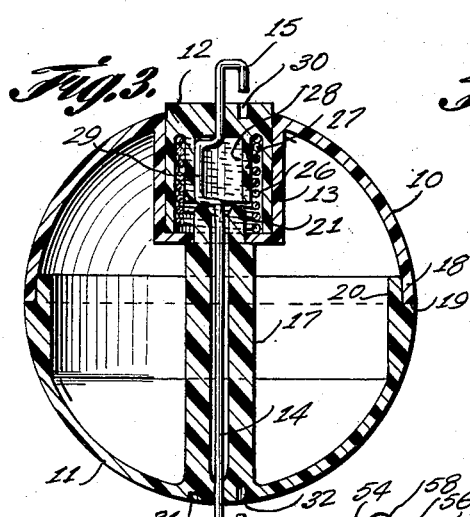
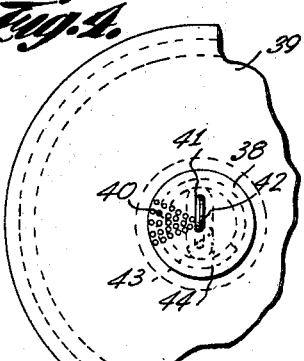
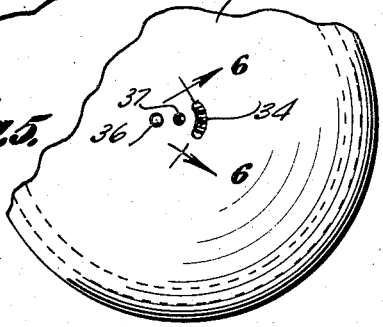
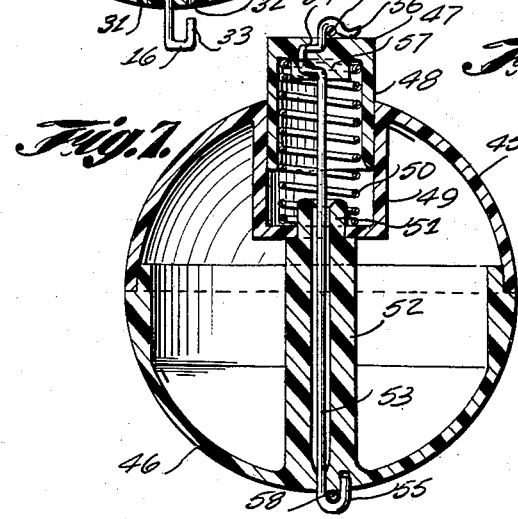
INVENTOR.
*Ludwig Schmidt*
BY *Victor J. Evans & Co.*
ATTORNEYS United States Patent Office 2,876,581
Patented Mar. 10, 1959

2,876,581

FISHING LINE FLOAT

Ludwig Schmidt, Montague, Mich.

Application April 20, 1954, Serial No. 424,417

7 Claims. (Cl. 43—44.95)

This invention relates to floats for fishing lines of the type wherein the line is threaded through eyes or clips at the top and bottom of the float and wherein the line is held by resilient means whereby it may readily be released to adjust the position of the float on the line, and in particular a bob which gives the fisherman a double line lock float wherein the harder the pull on the line the tighter the grip and wherein the float will not dangle or swing around the line when lifted out of the water so that it will not fray a line and in which the float is readily adjustable for different types of fishing.

The purpose of this invention is to provide a spring actuated button in a fishing line float whereby with the button urged outwardly by a spring in the float the float is secured in position on the line and with the button pressed inwardly the line is free so that the position of the float on the line may be adjusted.

Various methods have been used for retaining floats in position on fishing lines, however, with the conventional spring clips or wire coils it is difficult to slide the line through the holding elements particularly after corrosion or rust in said holding elements and for this reason fishing lines are damaged in adjusting the positions of floats thereon. With this thought in mind this invention contemplates an improved bob or float formed in two hemispherical sections with a wire having hooks on the ends extended through the sections and with a spring actuated button slidably mounted in one section of the float and adapted to coact with the eye or hook on one end of the wire or rod to secure the float in position on the line.

The object of this invention is, therefore, to provide means for forming a fishing line float or bob wherein a button slidably mounted in the float is adapted to coact with a wire or rod extended through the float for urging a hook or eye on one end of the float into a recess in the body portion thereof and for urging a line extended through a hook on the opposite end of the wire into holding position within the hook.

Another object of the invention is to provide a fishing line float having a button actuated line clamping member therein in which the button is adapted to be actuated by the thumb of a hand in which the float is held thereby freeing the other hand of the fisherman for drawing the fishing line through the holding element of the float.

A further object of the invention is to provide a fishing line float having hooks on the ends of a bar extended through the axis thereof with a spring actuated button also positioned on the axis and through which the rod extends in which the float is of a simple and economical construction.

With these and other objects and advantages in view the invention embodies a hollow ball formed in two sections with a sleeve extended inwardly of an opening in one section and with a button slidably mounted in said sleeve and positioned around a rod extended through the sleeve and sections of the float, the rod being provided with hooks on the ends and the button being urged outwardly by a spring in the sleeve.

Other features and advantages of the invention will appear from the following description taken in connection with the drawing, wherein:

Figure 1 is a side elevational view of the float or bob showing the position of the device in use in the water.

Figure 2 is a vertical section through the float, with the line gripping button thereof in an extended position.

Figure 3 is a section similar to that shown in Fig. 2 taken on a plane at a right angle to that shown in Fig. 2 and showing the button in the compressed position.

Figure 4 is a plan view of the float showing the button and with part of the float broken away.

Figure 5 is a plan view looking toward the lower end of the float showing a plurality of recesses into which the hook on the lower end of the rod of the float may be positioned.

Figure 6 is a detail showing a section through the recesses taken on line 6—6 of Fig. 5, the parts being shown on an enlarged scale.

Figure 7 is a vertical section, similar to that shown in Fig. 2 illustrating a modification wherein an offset portion of the rod is embedded in material forming the head of the button.

Referring now to the drawing wherein like reference characters denote corresponding parts the improved fishing bob or float of this invention includes a plastic ball having an upper section 10, a lower section 11, a button 12 slidably mounted in a sleeve 13 in the section 10 and a rod 14 having hooks 15 and 16 on ends thereof extended through a stem 17 integral with the section 11 and also extended through the sleeve 13 and button 12.

As illustrated, particularly in Figs. 2 and 3, the rim or lower edge 18 of the upper section 10 is positioned in an annular recess 19 of the lower section 11, the recess 19 being formed with an inner annular flange 20.

The stem 17 is provided with a tip 21 and the tip which extends through an opening 22 in a flange 23 on the lower end of the sleeve 13, is sealed in the opening with the flange 23 resting against a shoulder 24 spaced from the upper end of the stem 17. This seal may be made after the halves are assembled.

The button 12 is provided with a depending skirt 25 and a spring 26, which is positioned on the flange 23 of the sleeve 13 extends upwardly into the skirt 25 of the button 12 whereby the button 12 is urged outwardly.

The intermediate portion of the button is provided with a web 27 having an opening 28 in the intermediate part and an offset section 29 of the rod 14 is positioned in the opening 28 whereby the rod is corotatably locked with the button but is free to move axially with respect thereto. The offset section 29 of the rod 14 provides an abutment which moves in the sleeve or recess 13 upon initial inward movement of the button 12 to move the hook 16 away from engagement with the body section 11 and thereafter engaging the tip 21 of the stem or boss 17 to permit the button to move relative to the wire or rod 14 to disengage the second hook 15 from the button.

The hooks 15 and 16 are positioned on opposite ends of the rod 14 and, as shown in Fig. 3, the button 12 is provided with a recess 30 that is positioned to receive the end of the hook 15 and similar recesses 31 and 32 are provided in the section 11 to receive the end 33 of the hook 16.

The openings or recesses 31 and 32 may also be positioned, as illustrated in Figs. 5 and 6 wherein a series of recesses 34 of gradually increasing depths are positioned in a spherical element 35 and a recess 36, similar to the recess 31 may be provided on the opposite side of the opening 37 for the rod 14. The steps of different depths in the recess 34 provide means for gripping fishing lines of different thicknesses forming a larger or smaller loop for the line to slide through, and providing a stop when engaged by a knot on the end of the line.

In Fig. 4 the upper end of a button 38 in a sphehical housing 39, which also provides a bob or float, is provided with a series of gripping elements 40 to indicate the most desirable position on the end of the button for placing a thumb or finger to compress the spring of the button. In this design a rod 41 having an offset section 42 therein extends through the upper end of the sphere and the offset portion thereof is positioned in a slot 43 in the web or partition 44.

In the design illustrated in Fig. 7 an upper section 45, similar to the section 10 is positioned on a section 46, similar to the section 11 and a button 47 with a skirt 48 is slidably mounted in a sleeve 49 having a spring 50 therein and the sleeve is positioned over a tip 51 on the upper end of the stem 52 through which a rod 53 extends. The rod 53 is provided with an offset portion 54 and one end is provided with a hook 55, with the opposite end bent to form a spring clip 56.

With the parts formed in this manner the button 47 is pressed inwardly carrying the rod 53 which is embedded in a head 57 of the button whereby the hook 55 extends from the opposite side of the float and a fishing line, as indicated by the numeral 58 may readily be released from the float. With the parts assembled as illustrated in the designs illustrated in this application it is only necessary to press the button inwardly to release hooks at both ends of the float or bob whereby a fishing line may readily be threaded through the hooks or eyes, and with the fishing line in place the eyes are snapped into holding position by the spring in the button upon release of the button.

It will be understood that modifications, within the scope of the appended claims, may be made in the design and arrangement of the parts without departing from the spirit of the invention.

What is claimed is:

1. A device of the character described comprising a hollow float body divided into a pair of complementary members, each of said members having a centrally disposed integral sleeve-like projection, one of said projections extending inwardly and beyond the center of said float body to provide overlapping engagement with the free end portion of the other of said projections, the other of said projections having a recess forming a socket, a coil spring positioned in said socket, a cap member extending substantially over said spring having cylindrical wall portions slidably engaging and mounted in said socket of said other sleeve-like projection, a shaft extending through said cap member and said projections, a hook formed integrally with each end of said shaft, one of said projections having an end wall, said end wall having a first opening therethrough for the slidable reception of said shaft, said end wall having a second opening eccentrically positioned with respect to said first opening, said cap member having a first opening therethrough for the slidable reception of said shaft, said cap member having a second opening eccentrically positioned with respect to its first opening, said hooks having their free ends receivable in said eccentric openings, and locking means corotatably locking said shaft and said cap member, whereby the free end of only one of said hooks may be selectively angularly positioned out of a corresponding one of said eccentric openings but in engagement with said end wall to form a loop, the outer side of said end wall and said cap member being urged toward the bight portions of the respective hooks, said bight portions being adapted to receive a fishing line for interchangeably clamping and slidably mounting the float body on the fishing line.

2. A device as defined in claim 1 wherein said locking means is positioned within said socket and is located between the end of said socket and a portion of said cap member for successive longitudinal engagement with said portion of said cap member and the overlapping of said one of said projections to successively expose first one hook upon initial depression of said cap member and then the other hook upon continued depression of said cap member into the socket.

3. A device as defined in claim 1 wherein said cap member has an end surface formed thereon particularly characterized by the formation thereon of a plurality of gripping elements to facilitate manual manipulation of said cap member.

4. A device as defined in claim 1 wherein said second opening of said end wall comprises a series of recesses of gradually increasing depth positioned in register with an adjoining free end of a corresponding one of said hooks to provide means together therewith for forming loops of different size when the free end is received in the opening.

5. A fishing float comprising a body having internal boss means provided with a passage therethrough, said boss means having formed therein at one end of said passage an enlarged recess having cylindrical side walls and a radial end wall, a button reciprocably supported by said cylindrical side walls and movable in said recess inwardly and outwardly, a coil spring having one end bottomed against said radial wall and the other end engaging and biasing said button outwardly, said button having a passage formed therethrough in alignment with said passage in said boss means, a wire extending through said passages in said body and said button and being of longer length than the passage through said body, and first and second hooks formed on the opposite ends of said wire engaging said body and said button, respectively, and adapted to clamp a fishing line inserted under the hooks, said button being movable inwardly for selectively inserting a fishing line under said hooks, said wire having medial abutment means movable in said recess upon initial inward movement of said button to move said first hook away from engagement with said body and thereafter engaging said boss means to permit said button to be moved relative to said wire for disengaging said second hook, said abutment means constituting a bent portion integral with said wire, said button having means operatively engaging said abutment means locking said button and said wire for corotation while admitting relative axial movement therebetween.

6. A fishing float as defined in claim 5, said body having a series of recesses of gradually increasing depth formed therein and positioned in register with said first hook to provide means together with said first hook for forming loops of different size when the hook is engaged against the body in said recesses.

7. A fishing float comprising a first hemispherical part having a radially extending first boss formed therein provided with a passage therethrough, a second hemispherical part having a radially extending second boss formed therein comprising a cylindrical wall and a radial bottom wall, said second boss providing a recess in said second part, said radial wall having an opening formed therein through which said first boss projects, said first and second parts being bonded in sealed firm assembly with one another at adjoining abutment surfaces provided by the peripheral edges thereof and at the point of juncture between said radial wall and said first boss, a third part constituting a generally cylindrical plunger reciprocably supported by said cylindrical walls and movable in said recess inwardly and outwardly, a coil spring having one end surrounding the projecting portion of said first boss and being bottomed against said radial wall, the other end of said spring engaging said third part to bias said third part outwardly, said third part having a passage formed therethrough in alignment with said passage in said first boss, a wire form member extending through said passages in said parts and being of longer length than the diameter of the assembled hemispherical parts, and first and second hooks formed on the opposite ends of said wire form member engaging said first part and said third part respectively and adapted to clamp a fishing line inserted under the hooks, said third part being movable inwardly for selectively inserting a fishing line under said hooks, said wire form member having medial abutment means movable in said recess upon initial inward movement of said third part to move said first hook away from engagement with said first part and thereafter engaging said projecting portion of said first boss to permit said third parts to be moved relative to said wire form member for disengaging said second hook, said abutment means constituting a bent portion of wire integral with said wire form member, said first part having circumferentially spaced recesses of different axial depth formed circumjacent said passage therein and seating said first hook in either a fishing line clamping position or in a casting loop forming position, said third part having a slot formed therein receiving a portion of said bent portion of wire to rotate said wire form member with said third part, thereby to selectively position said first hook in register with the different recesses.

References Cited in the file of this patent

UNITED STATES PATENTS

| | | |
|---|---|---|
| 575,674 | Woodward | Jan. 19, 1897 |
| 1,371,170 | Johnson | Mar. 8, 1921 |
| 2,065,854 | Edel et al. | Dec. 29, 1936 |
| 2,255,853 | Makus et al. | Sept. 16, 1941 |
| 2,415,692 | Huston | Feb. 11, 1947 |
| 2,758,410 | Cowsert | Aug. 14, 1956 |
| 2,767,506 | Robinson | Oct. 23, 1956 |